(12) United States Patent
Lee et al.

(10) Patent No.: US 12,057,040 B2
(45) Date of Patent: Aug. 6, 2024

(54) APPARATUS AND METHOD FOR EVALUATING DEGRADATION OF DISPLAY PANEL AND DISPLAY DRIVER USING DEGRADATION EVALUATION VALUE

(71) Applicant: Silicon Works Co., Ltd., Daejeon (KR)

(72) Inventors: Min Ji Lee, Daejeon (KR); Jun Young Park, Daejeon (KR); Ji Won Lee, Daejeon (KR); Suk Ju Kang, Daejeon (KR); Yu Lim Seo, Daejeon (KR); Jung Hyun Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 245 days.

(21) Appl. No.: 17/478,566

(22) Filed: Sep. 17, 2021

(65) Prior Publication Data

US 2022/0093022 A1 Mar. 24, 2022

(30) Foreign Application Priority Data

Sep. 23, 2020 (KR) .......................... 10-2020-0123106

(51) Int. Cl.
*G09G 3/00* (2006.01)
*G06T 7/00* (2017.01)
*G09G 3/20* (2006.01)

(52) U.S. Cl.
CPC .......... *G09G 3/006* (2013.01); *G06T 7/0002* (2013.01); *G09G 3/2007* (2013.01);
(Continued)

(58) Field of Classification Search
CPC ................ G09G 3/006; G09G 3/2007; G09G 3/2092–2096; G09G 2310/0275;
(Continued)

(56) References Cited

U.S. PATENT DOCUMENTS 6,163,622 A * 12/2000 Abdel-Mottaleb .......................... G06F 16/5838 707/999.006
2006/0104598 A1 * 5/2006 Gilles ................. G06F 16/7847 707/E17.028

(Continued)

OTHER PUBLICATIONS

Bouma, Gerlof; "Normalized (Pointwise) Mutual Information in Collocation Extraction"; Department Linguistic, Universitat Potsdam; pp. 1-11.
(Continued)

*Primary Examiner* — Keith L Crawley
(74) *Attorney, Agent, or Firm* — POLSINELLI PC

(57) ABSTRACT

Disclosed are an apparatus and method for evaluating the degradation of a display panel, for evaluating a degradation state of a display panel, such as mura. The method of evaluating the degradation of a display panel may be implemented by generating mutual information by using a first histogram distribution vector of a reference frame having a target grayscale level and a second histogram distribution vector of an evaluation frame displayed on a display panel in response to the target grayscale level, generating normalized mutual information of the mutual information, providing a weight into which a cognitive characteristic of a distribution of grayscales of pixels of the evaluation frame is incorporated, and outputting an evaluation value obtained by multiplying the normalized mutual information and the weight.

20 Claims, 4 Drawing Sheets

(52) U.S. Cl.
CPC .............. *G06T 2207/20076* (2013.01); *G06T 2207/30168* (2013.01); *G09G 2320/0233* (2013.01); *G09G 2320/045* (2013.01); *G09G 2360/16* (2013.01); *G09G 2370/10* (2013.01)

(58) Field of Classification Search
CPC ....... G09G 2320/02; G09G 2320/0233; G09G 2320/029–045; G09G 2320/0693; G09G 2330/12; G09G 2360/14–16; G09G 2370/10; G06T 5/007–009; G06T 5/40–50; G06T 7/0002; G06T 7/001; G06T 7/0014; G06T 2207/20076; G06T 2207/20212–20228; G06T 2207/30168; G06V 10/50; G06V 10/758; H04N 1/407–4078
See application file for complete search history.

(56) References Cited

U.S. PATENT DOCUMENTS

2018/0150962 A1\* 5/2018 Fletcher .................... G06T 7/35
2021/0327343 A1\* 10/2021 Han ..................... G09G 3/3225

OTHER PUBLICATIONS

Chou, Chun-Hsien, et al.; "A Perceptually Tuned Subband Image Coder Based on the Measure of Just-Noticeable-Distortion Profile"; IEEE Transactions on Circuits and Systems for Video Technology; vol. 5, No. 6; Dec. 1995; pp. 467-476.

Kraskov, Alexander, et al.; "Estimating Mutual Information"; John-von-Neumann Institute for Computing; Forschungszentrum Julich, D-52425 Julich; Feb. 2, 2008; pp. 1-16.

Wang, Zhou, et al.; "Image Quality Assessment: From Error Visibility to Structural Similarity"; IEEE Transactions on Image Processing; vol. 13, No. 4; Apr. 2004; pp. 600-612.

Wang, Zhou, et al.; "Multi-Scale Structural Similarity for Image Quality Assessment"; Center for Neural Sci. and Courant Inst. of Math. Sci., New York Univ. / Dept. of Electrical and Computer Engineering, Univ. of Texas at Austin; pp. 1398-1402.

Zhang, Lin, et al.; "FSIM: A Feature Similarity Index for Image Quality Assessment"; IEEE Transactions on Image Processing; vol. 20, No. 8; Aug. 2011; pp. 2378-2386.

\* cited by examiner

Fig. 3
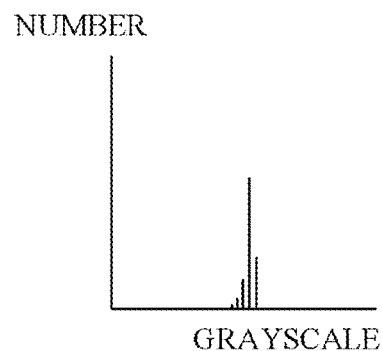
Fig. 4
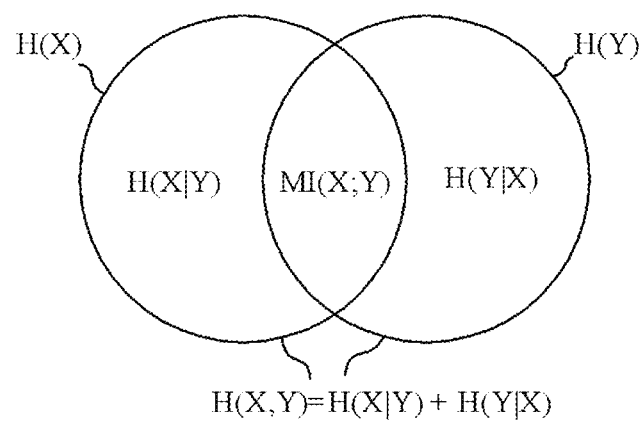
$H(X,Y) = H(X|Y) + H(Y|X)$
Fig. 5

APPARATUS AND METHOD FOR EVALUATING DEGRADATION OF DISPLAY PANEL AND DISPLAY DRIVER USING DEGRADATION EVALUATION VALUE

BACKGROUND

1. Technical Field

The present disclosure relates to the evaluation of degradation of a display panel, and more particularly, to an apparatus and method for evaluating the degradation of a display panel, for evaluating a degradation state of a display panel, such as mura, and a display driver using a degradation evaluation value.

2. Related Art

An ideal display panel outputs an image having the same grayscale level as a target grayscale level in response to display data having the target grayscale level.

However, when degradation, such as mura, occurs in a display panel, an image having a grayscale level different from a target grayscale level is outputted through a degraded pixel or region of the display panel.

In most cases, a degree of degradation, such as mura, may be determined using a method of directly visually evaluating, by a worker, the display panel.

When degradation is present in a display panel, a display system adopts a compensation technology for solving the degradation, such as mura. As a result, the display panel outputs an image having reduced degradation in response to display data corrected by the compensation technology.

In order to more accurately compensate for degradation, a degradation state of a display panel needs to be quantitatively evaluated. Furthermore, although degradation has been reduced by applying a compensation technology, the reduced degradation state of the display panel needs to be quantitatively evaluated.

Therefore, it is necessary to develop a technology capable of quantitatively evaluating a degradation state or a reduced degradation state of a display panel.

SUMMARY

Various embodiments are directed to providing an apparatus and method for evaluating the degradation of a display panel, which can quantitatively evaluate a degradation state of a display panel, such as mura.

Furthermore, various embodiments are directed to providing an apparatus and method for evaluating the degradation of a display panel, which evaluate a degradation degree through the analysis of a correlation between a reference frame of a reference image and an evaluation frame of an evaluation image.

Furthermore, various embodiments are directed to providing a display driver capable of solving the degradation of a display panel by compensating for display data by using an evaluation value obtained by evaluating a degradation state.

In an embodiment, an apparatus for evaluating the degradation of a display panel includes a first histogram analysis unit configured to output a first histogram distribution vector of a reference frame having a target grayscale level, a second histogram analysis unit configured to output a second histogram distribution vector of an evaluation frame displayed on a display panel in response to the target grayscale level, a correlation analysis unit configured to generate mutual information by using the first histogram distribution vector and the second histogram distribution vector and to generate normalized mutual information of the mutual information, a weight provision unit configured to provide a weight into which a cognitive characteristic of a distribution of grayscales of pixels of the evaluation frame is incorporated, and an output unit configured to output an evaluation value obtained by calculating the normalized mutual information and the weight.

In an embodiment, a method of evaluating the degradation of a display panel includes outputting a first histogram distribution vector of a reference frame having a target grayscale level, outputting a second histogram distribution vector of an evaluation frame displayed on a display panel in response to the target grayscale level, generating mutual information by using the first histogram distribution vector and the second histogram distribution vector, generating normalized mutual information of the mutual information, providing a weight into which a cognitive characteristic of a distribution of grayscales of pixels of the evaluation frame is incorporated, and outputting an evaluation value obtained by multiplying the normalized mutual information and the weight.

In an embodiment, a display driver includes an evaluation value storage unit configured to store an evaluation value and a degradation compensator configured to receive the evaluation value and compensate for degradation by converting display data based on the evaluation value. The evaluation value corresponds to a value obtained by calculating normalized mutual information and a weight.

The present disclosure has an advantage in that it can calculate a quantitative evaluation value in response to a degradation state of a display panel, such as mura.

Furthermore, the present disclosure has an advantage in that it can determine a degradation degree of a display panel based on a quantitative evaluation value calculated through the analysis of a correlation between a reference frame of a reference image and an evaluation frame of an evaluation image.

Furthermore, the present disclosure has an advantage in that it can solve the degradation of a display panel by compensating for display data by using an evaluation value obtained by evaluating a degradation state.

BRIEF DESCRIPTION OF THE DRAWINGS

FIG. 3 is an exemplary diagram of a histogram of an evaluation frame.

FIG. 4 is an exemplary diagram illustrating a relation between entropy and mutual information in a band diagram form.

FIG. 5 is an exemplary diagram of local pixels around a pixel.

DETAILED DESCRIPTION

The present disclosure discloses a technology which outputs quantitative results for evaluating a degree of degradation, such as mura present in a display panel (not illustrated).

The present disclosure is configured to output an evaluation value to evaluate a degradation degree through the analysis of a correlation between a reference frame of a reference image and an evaluation frame of an evaluation image.

In this case, the reference image may be understood as an image previously set for comparison with the evaluation image. One frame of the reference image is called a reference frame. All pixels of the reference frame are set to have the same target grayscale level.

The evaluation image may be understood as an image displayed on a display panel. One frame of the evaluation image is called an evaluation frame. The evaluation frame may be understood as an image of one frame displayed on the display panel by display data having a target grayscale level.

In this case, the target grayscale level of the reference frame and the target grayscale level of the display data provided to display the evaluation frame may be understood as being the same.

The present disclosure is configured to evaluate a degradation degree of an evaluation image through the analysis of a correlation between the reference frame and the evaluation frame and to output an evaluation value as the results of the evaluation.

Figure 1:
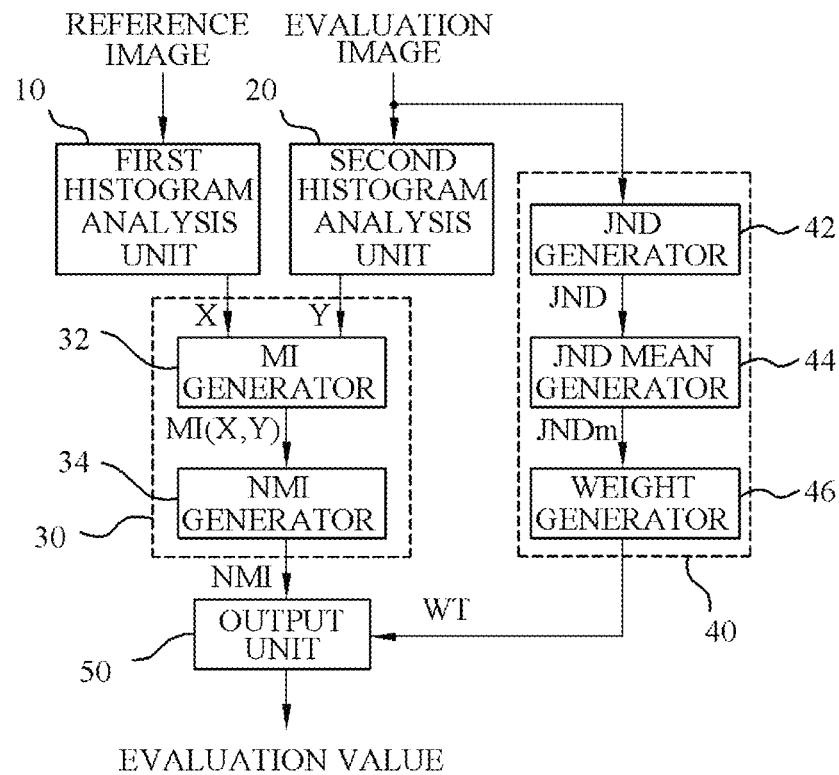
FIG. 1 is a block diagram illustrating an apparatus for evaluating the degradation of a display panel according to a preferred embodiment of the present disclosure.

An embodiment for the present disclosure may be constructed as in FIG. 1. The embodiment of FIG. 1 includes a first histogram analysis unit 10, a second histogram analysis unit 20, a correlation analysis unit 30, a weight provision unit 40 and an output unit 50.

The first histogram analysis unit 10 outputs a first histogram distribution vector X of a reference frame having a target grayscale level.

Figure 2:
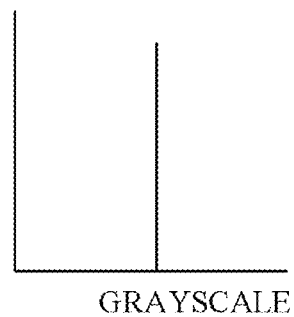
FIG. 2 is an exemplary diagram of a histogram of a reference frame.

To this end, the first histogram analysis unit 10 generates a first histogram, such as that of FIG. 2 illustrating the number of pixels per grayscale in a reference frame. As may be seen from the first histogram, the grayscales of the pixels of the reference frame are distributed only in a target grayscale.

The first histogram analysis unit 10 may output the histogram distribution vector X indicating a change in the distribution of the pixels for each grayscale, such as that of FIG. 2.

The second histogram analysis unit 20 outputs a second histogram distribution vector Y of an evaluation frame displayed on a display panel in response to a target grayscale level.

To this end, the second histogram analysis unit 20 generates a second histogram, such as that of FIG. 3 indicating the number of pixels per grayscale in an evaluation frame. As may be seen from the second histogram, the grayscales of the pixels of the evaluation frame are distributed around a target grayscale. Pixels of the evaluation frame having the target grayscale may be understood as having no degradation. Pixels of the evaluation frame out of the target grayscale may be understood as having grayscales deformed by degradation.

The second histogram analysis unit 20 may output the histogram distribution vector Y indicating a change in the distribution of pixels for each grayscale, such as that of FIG. 3.

The correlation analysis unit 30 is configured to generate mutual information (hereinafter referred to as "MI") by using the first histogram distribution vector X and the second histogram distribution vector Y and to generate normalized mutual information (hereinafter referred to as "NMI") of the mutual information MI.

To this end, the correlation analysis unit 30 may include an MI generator 32 and an NMI generator 34.

Among the mutual information MI generator 32 and the NMI generator 34, the mutual information MI generator 32 may generate the mutual information MI according to Equation 1 below.

$$MI(X, Y) = \Sigma_{y \in Y} \Sigma_{x \in X} p(x, y) \log \frac{p(x, y)}{P(x)p(y)}$$ [Equation 1]

In Equation 1, MI(X,Y) indicates mutual information between the first histogram distribution vector X and the second histogram distribution vector Y. x is a discrete probability variable of the first histogram distribution vector X. y is a discrete probability variable of the second histogram distribution vector Y. P(x,y) is a joint probability distribution of the discrete probability variables x and y. p(x) is a surrounding probability distribution of discrete probability variables x of the histogram distribution vector X of the reference frame. p(y) is a surrounding probability distribution of discrete probability variables y of the histogram distribution vector Y of the reference frame.

The mutual information MI(X,Y) is an information quantity indicating which relation the discrete probability variables x and y have. More specifically, the mutual information MI(X,Y) means mutual dependency between the discrete probability variables x and y, that is, the amount of information provided by one probability variable with respect to the other probability variable.

When a joint probability distribution of the discrete probability variables x and y is P(x,y) and surrounding probability distributions of the discrete probability variables x and y are p(x) and p(y), the mutual information MI(X, Y) may be calculated as in Equation 1.

The mutual information MI(X,Y) may be generated using entropy according to Equation 2 below. In this case, the entropy means an expected value of an information quantity of all cases, and is used to indicate the amount of uncertainty of a probability distribution of all cases.

$$MI(X,Y)=H(X)+H(Y)-H(X,Y)$$ [Equation 2]

In Equation 2, MI(X,Y) indicates mutual information between the first histogram distribution vector X and the second histogram distribution vector Y. H(X) is surrounding entropy of the first histogram distribution vector X, and indicates a distribution of grayscales of the reference frame. H(Y) is surrounding entropy of the second histogram distribution vector Y, and indicates a distribution of grayscales of the evaluation frame. H(X,Y) is joint entropy, and indicates the sum of the distribution of grayscales of the reference frame, which do not overlap grayscales of the evaluation frame, and the distribution of grayscales of the evaluation frame, which do not overlap grayscales of the reference frame.

In Equation 2, H(X) is Shannon entropy of p(x). H(Y) is Shannon entropy of p(y). The Shannon entropy H(X) may be calculated by Equation 3 below. The Shannon entropy H(Y) may be calculated by Equation 4 below.

$$H(X)=-\Sigma_x p(X)*\log p(X)$$ [Equation 3]

$$H(Y)=-\Sigma_y p(Y)*\log p(Y)$$ [Equation 4]

In Equations 3 and 4, p(X) is a probability distribution of the first histogram distribution vectors X. p(Y) is a probability distribution of the second histogram distribution vectors Y. x is a discrete probability variable of the first histogram distribution vector X. y is a discrete probability variable of the second histogram distribution vector Y.

Equations 2, 3 and 4 may be confirmed in "Normalized (pointwise) Mutual Information in Collocation Extraction" of Bouma, Gerlof introduced in Proceedings of GSCL 31-40 in 2009.

A relation between the entropy and the mutual information MI(X,Y) may be illustrated as a band diagram of FIG. 4.

In FIG. 4, the mutual information MI(X,Y) corresponds to intersection of the Shannon entropy H(X) and the Shannon entropy H(Y). Furthermore, joint entropy H(X,Y) corresponds to union being the sum of H(X|Y) not overlapping the evaluation frame in the Shannon entropy H(X) of the reference frame and H(Y|X) not overlapping the reference frame in the Shannon entropy H(Y) of the evaluation frame.

From FIG. 4, it may be more clearly understood that the mutual information MI(X,Y) is generated using entropy according to Equation 2.

The mutual information MI(X,Y) may have a problem in that it is used in clustering for classification, and thus needs to be universally normalized.

The NMI generator 34 is for normalizing the mutual information MI(X,Y), and is configured to convert the mutual information MI(X,Y) into NMI having a preset range. In this case, in order to normalize the NMI, the preset range may be exemplified as 0 to 1.

The NMI generator 34 may convert MI into NMI according to Equation 5 below.

$$NMI = \sqrt{\frac{MI(X,Y)^2}{H(X)*H(Y)}}$$ [Equation 5]

In Equation 5, the Shannon entropy H(X) is calculated by Equation 3 above, and the Shannon entropy H(Y) is calculated by Equation 4 above.

The NMI may be represented as a value between 0 to 1 according to Equation 5 above. As the NMI is closer to 1, similarity between the first histogram distribution vector X and the second histogram distribution vector Y is high. As the NMI is closer to 0, a difference between the first histogram distribution vector X and the second histogram distribution vector Y is great.

The output unit 50 changes NMI provided by the NMI generator 34 of the correlation analysis unit 30 so that a cognitive characteristic of a distribution of grayscales of pixels of the evaluation frame is incorporated into the NMI, and outputs an evaluation value corresponding to the change. The cognitive characteristics can be understood as standardized values for the degree to which a person feels for the distribution of grayscales of pixels of the evaluation frame.

To this end, the output unit 50 is configured to output the evaluation value obtained by multiplying the NMI and a weight WT of the weight provision unit 40.

The weight WT for incorporating the cognitive characteristic of a distribution of grayscales of pixels of the evaluation frame is provided by the weight provision unit 40.

To this end, the weight provision unit 40 includes a just noticeable difference (hereinafter referred to as "JND") generator 42, a JND mean generator 44 and a weight generator 46.

In this case, the JND defines a cognitive minimum brightness difference of an average brightness value based on the mean of brightness among local characteristics of an image signal.

The JND is generated by the JND generator 42. That is, the JND generator 42 generates JNDs of an evaluation frame for each pixel.

More specifically, the JND generator 42 first calculates an average brightness value of local pixels around each pixel for each pixel of the evaluation frame.

The average brightness value of the local pixels around coordinates (x,y) may be defined as I(x,y). In FIG. 5, the average brightness value I(x,y) may be understood as an average brightness value of pixels belonging to five columns and five rows around the coordinates (x,y).

The JND generator 42 calculates an average brightness value of local pixels of all pixels of the evaluation frame.

Furthermore, the JND generator 42 provides JNDs corresponding to average brightness values.

When brightness of a pixel at the coordinates (x, y) is different from I(x, y), that is, the average of local pixels, by a JND or more, the coordinates (x, y) may be cognized by a human being. In contrast, when brightness of a pixel at the coordinates (x, y) is different from I(x, y), that is, the average of local pixels, by less than a JND, the coordinates (x, y) is not cognized by a human being.

Figure 6:
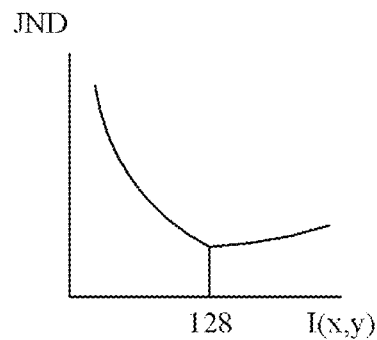
FIG. 6 is a graph exemplifying a relation between a just noticeable difference and an average brightness value.

That is, the JND may be understood as a threshold by a human being, and may be set for the average brightness value I(x,y) as in FIG. 6.

Referring to FIG. 6, on the basis of the middle of a range of average brightness values, the JND has a value that increases along a first curve as the average brightness value increases, and has a value that increases along a second curve as the average brightness value decreases. In this case, the second curve has a higher rate of increase than the first curve.

For example, the sensitivity of a middle brightness region around 128 is the lowest in the range of average brightness values defined between 0 and 255. Furthermore, sensitivity increases along the first curve as brightness gradually becomes bright from the average brightness value of 128. Sensitivity increases along the second curve as brightness gradually becomes dark from the average brightness value of 128. Furthermore, a change in the sensitivity is greater in a region that gradually becomes dark from the average brightness value of 128 than in a region that gradually becomes bright from the average brightness value of 128.

The JND generator 42 may provide JND values corresponding to average brightness values of pixels of the evaluation frame as in FIG. 6.

The JND mean generator 44 generates the mean JNDm of JNDs of the evaluation frame.

Furthermore, the weight generator 46 provides a weight WT corresponding to the mean JNDm.

The weight generator 46 may be configured to divide a range in which means are formed into a plurality of weighted ranges, allocate a preset weight to each weighted range, and output a weight of a weighted range corresponding to the mean in response to the mean.

For example, if the mean is formed in a range of 0 to 12, weighted ranges may be divided into a first weighted range in which the mean is greater than 0 and 4 or less, a second weighted range in which the mean is greater than 4 and 8 or less, and a third weighted range in which the mean is greater than 8 and 12 or less.

Furthermore, a weight WT of the first weighted range may be set to 0.9. A weight WT of the second weighted range may be set to 0.95. A weight WT of the third weighted range may be set to 1.

Therefore, the weight generator 46 may select one of 9.9, 9.95 and 1 based on the mean, and may output the selected value as the weight WT.

The output unit 50 may output an evaluation value obtained by multiplying the weight WT and NMI. As a result, the evaluation value may have a value into which a JND characteristic different in a low grayscale and a high grayscale is incorporated.

The apparatus for evaluating the degradation of a display panel according to the present disclosure, which has been described with reference to FIGS. 1 to 6, implements a degradation evaluation method of sequentially processing the following steps.

That is, the evaluation degradation method includes steps of: outputting a first histogram distribution vector X of a reference frame having a target grayscale level; outputting a second histogram distribution vector Y of an evaluation frame displayed on a display panel in response to the target grayscale level; generating MI by using the first histogram distribution vector X and the second histogram distribution vector Y; generating NMI of the mutual information MI; providing a weight WT into which a cognitive characteristic of a distribution of grayscales of pixels of the evaluation frame is incorporated; and outputting an evaluation value obtained by multiplying the NMI and the WT.

The present disclosure may calculate an evaluation value capable of quantitatively evaluating a degradation state of a display panel, such as mura.

When a great evaluation value is calculated according to the present disclosure, histogram distribution vectors of a reference frame and an evaluation frame are similar, and a degradation degree of the evaluation frame may be determined to be small. When a small evaluation value is calculated, a degradation degree of the evaluation frame may be determined to be great because a difference between histogram distribution vectors of the reference frame and the evaluation frame is great.

As described above, the present disclosure has an advantage in that it can evaluate a degradation degree of a display panel through the analysis of a correlation between a reference frame of a reference image and an evaluation frame of an evaluation image.

Figure 7:
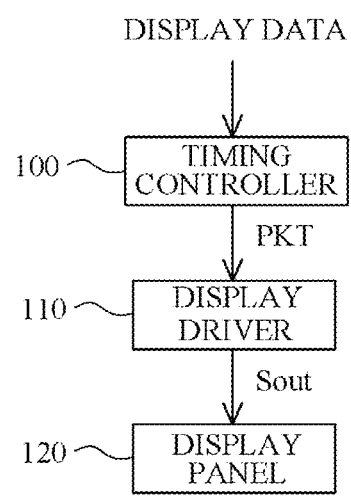
FIG. 7 is a block diagram exemplifying a display system.

Display data is provided by a timing controller 100 as in FIG. 7. The timing controller 100 constructs a packet PKT of the display data and provides the packet to a display driver 110.

The display driver 110 is configured to restore the display data after receiving the packet, generate source signals Sout corresponding to the display data, and provide the source signals Sout to a display panel 120.

Figure 8:
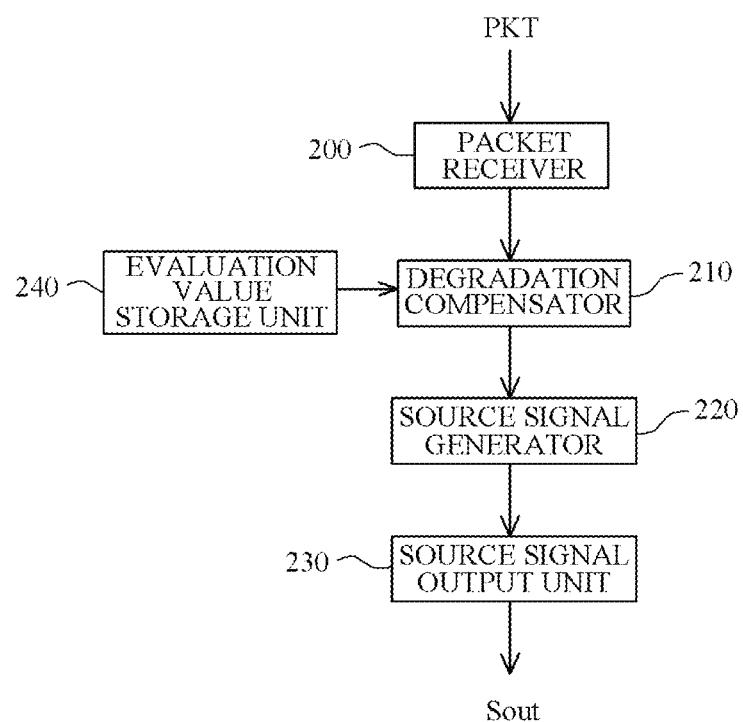
FIG. 8 is a detailed block diagram of a display driver of the present disclosure.

The display driver 110 of FIG. 7 may be exemplarily constructed as in FIG. 8.

Referring to FIG. 8, the display driver 110 may include a packet receiver 200, a degradation compensator 210, a source signal generator 220, a source signal output unit 230 and an evaluation value storage unit 240.

The packet receiver 200 receives a packet PKT of display data provided by the timing controller 100, and restores the display data from the packet PKT.

The degradation compensator 210 receives display data of the packet receiver and an evaluation value of the evaluation value storage unit 240, and may compensate for degradation by converting the display data based on the evaluation value.

The conversion of the display data based on the evaluation value may be performed in a pixel unit of a display panel. The display data may be converted by a result of an operation using the evaluation value or a result of an operation of a compensation equation using the evaluation value as a coefficient.

The source signal output unit 220 drives a source signal Sout in response to display data whose degradation has been compensated for, and provides the source signal Sout to the display panel 120.

The evaluation value storage unit 240 may be constructed using a memory, such as an EEPROM, and may store and provide an evaluation value calculated according to embodiments of the present disclosure of FIGS. 1 to 6.

The display driver of the present disclosure can solve the degradation of a display panel by compensating for display data based on an evaluation value as described above.

What is claimed is:

1. An apparatus for evaluating degradation of a display panel, comprising:
a first histogram analysis unit configured to output a first histogram distribution vector of a reference frame having a target grayscale level;
a second histogram analysis unit configured to output a second histogram distribution vector of an evaluation frame displayed on a display panel in response to the target grayscale level;
a correlation analysis unit configured to generate mutual information based on the first histogram distribution vector and the second histogram distribution vector and to generate normalized mutual information of the mutual information;
a weight provision unit configured to provide a weight into which a cognitive characteristic of a distribution of grayscales of pixels of the evaluation frame is incorporated; and
an output unit configured to output an evaluation value based on the mutual information and the weight.

2. The apparatus of claim 1, wherein the pixels of the reference frame are configured to have an identical target grayscale level.

3. The apparatus of claim 1, wherein:
the first histogram analysis unit generates a first histogram indicative of a number of the pixels per grayscale in the reference frame and outputs the first histogram distribution vector corresponding to the first histogram, and
the second histogram analysis unit generates a second histogram indicative of a number of the pixels per each grayscale in the evaluation frame and outputs the second histogram distribution vector corresponding to the second histogram.

4. The apparatus of claim 1, wherein the correlation analysis unit comprises:
a mutual information generator configured to generate the mutual information by using an equation of MI(X,Y)=

$$MI(X, Y) = \Sigma_{y \in Y} \Sigma_{x \in X} p(x, y) \log \frac{p(x, y)}{P(x)p(y)};$$

and
a normalized mutual information generator configured to convert the mutual information into the normalized mutual information having a preset range,
wherein the mutual information MI(X,Y) indicates the mutual information between a first histogram distribution vector X and a second histogram distribution vector Y, the x is a discrete probability variable of the first histogram distribution vector X, the y is a discrete probability variable of the second histogram distribution vector Y, the P(x,y) is a joint probability distribution of the discrete probability variables x and y, the p(x) is a surrounding probability distribution of the discrete probability variable x, and the p(y) is a surrounding probability distribution of the discrete probability variable y.

5. The apparatus of claim 4, wherein the normalized mutual information generator converts the mutual information into the normalized mutual information based on $$\sqrt{\frac{MI(X,Y)^2}{H(X)*H(Y)}},$$

wherein the H(X) is calculated by $-\Sigma_x p(X)*\log p(X)$, the H(Y) is calculated by $-\Sigma_y p(Y)*\log p(y)$, the p(X) is a probability distribution of the first histogram distribution vector X, the p(Y) is a probability distribution of the second histogram distribution vector Y, the x is a discrete probability variable of the first histogram distribution vector X, and the y is a discrete probability variable of the second histogram distribution vector Y.

6. The apparatus of claim 1, wherein the correlation analysis unit comprises:
   a mutual information generator configured to generate the mutual information by using an equation of MI(X,Y)=H(X)+H(Y)−H(X,Y); and
   a normalized mutual information generator configured to convert the mutual information into the normalized mutual information having a preset range,
   wherein the mutual information MI(X,Y) indicates the mutual information between a first histogram distribution vector X and a second histogram distribution vector Y, the H(X) is surrounding entropy of the first histogram distribution vector X and indicates a distribution of grayscales of the reference frame, the H(Y) is surrounding entropy of the second histogram distribution vector Y and indicates a distribution of grayscales of the evaluation frame, the H(X,Y) is joint entropy and indicates a sum of the distribution of grayscales of the reference frame, which do not overlap grayscales of the evaluation frame, and the distribution of grayscales of the evaluation frame, which do not overlap grayscales of the reference frame.

7. The apparatus of claim 6, wherein the normalized mutual information generator converts the mutual information into the normalized mutual information based on $$\sqrt{\frac{MI(X,Y)^2}{H(X)*H(Y)}},$$

wherein the H(X) is calculated by $-\Sigma_x p(X)*\log p(X)$, the H(Y) is calculated by $\Sigma_y p(Y)*\log p(Y)$, the p(X) is a probability distribution of the first histogram distribution vector X, the p(Y) is a probability distribution of the second histogram distribution vector Y, the x is a discrete probability variable of the first histogram distribution vector X, and the y is a discrete probability variable of the second histogram distribution vector Y.

8. The apparatus of claim 1, wherein the weight provision unit comprises:
   a difference generator configured to generate perceivable differences of the evaluation frame for each pixel;
   a difference mean generator configured to generate means of the perceivable differences of the evaluation frame; and
   a weight generator configured to provide a weight corresponding to the means of the perceivable differences.

9. The apparatus of claim 8, wherein:
   the difference generator calculates an average brightness value of local pixels around each pixel for each pixel and provides the perceivable differences corresponding to average brightness values,
   wherein a perceivable difference has a value increasing along a first curve as the average brightness value increases and has a value increasing along a second curve as the average brightness value decreases, based on a middle of a range of the average brightness values, and
   the second curve has a higher rate of increase than the first curve.

10. The apparatus of claim 8, wherein the weight generator divides a range in which the means are formed into a plurality of weighted ranges,
    allocates a preset weight to each weighted range, and
    outputs the weight having weighted range corresponding to a mean value.

11. A method of evaluating degradation of a display panel, comprising:
    outputting a first histogram distribution vector of a reference frame having a target grayscale level;
    outputting a second histogram distribution vector of an evaluation frame displayed on a display panel in response to the target grayscale level;
    generating mutual information by using the first histogram distribution vector and the second histogram distribution vector;
    generating normalized mutual information of the mutual information;
    providing a weight into which a cognitive characteristic of a distribution of grayscales of pixels of the evaluation frame is incorporated; and
    outputting an evaluation value obtained by multiplying the normalized mutual information and the weight.

12. The method of claim 11, wherein:
    the outputting of the first histogram distribution vector comprises generating a first histogram indicative of a number of the pixels per grayscale in the reference frame, and outputting the first histogram distribution vector corresponding to the first histogram, and
    the outputting of the second histogram distribution vector comprises generating a second histogram indicative of the number of the pixels per grayscale in the evaluation frame, and outputting the second histogram distribution vector corresponding to the second histogram.

13. The method of claim 11, wherein the mutual information is generated by using an equation of $$MI(X,Y) = \Sigma_{y \in Y} \Sigma_{x \in X} p(x,y) \log \frac{p(x,y)}{P(x)p(y)},$$

wherein the mutual information MI(X,Y) indicates the mutual information between a first histogram distribution vector X and a second histogram distribution vector Y, the x is a discrete probability variable of the first histogram distribution vector X, the y is a discrete probability variable of the second histogram distribution vector Y, the P(x,y) is a joint probability distribution of the discrete probability variables x and y, the p(x) is a surrounding probability distribution of the discrete probability variable x, and the p(y) is a surrounding probability distribution of the discrete probability variable y.

14. The method of claim 11, wherein the mutual information is generated by using an equation of MI(X,Y)=H(X)+H(Y)−H(X,Y), wherein the mutual information MI(X,Y) indicates the mutual information between a first histogram distribution vector X and a second histogram distribution vector Y, the H(X) is surrounding entropy of the first histogram distribution vector X and indicates a distribution of grayscales of the reference frame, the H(Y) is surrounding entropy of the second histogram distribution vector Y and indicates a distribution of grayscales of the evaluation frame, the H(X,Y) is joint entropy and indicates a sum of the distribution of grayscales of the reference frame, which do not overlap grayscales of the evaluation frame, and the distribution of grayscales of the evaluation frame, which do not overlap grayscales of the reference frame.

15. The method of claim 11, wherein the normalized mutual information is generated $$\sqrt{\frac{MI(X,Y)^2}{H(X)*H(Y)}},$$

based on wherein the mutual information MI(X,Y) indicates the mutual information between a first histogram distribution vector X and a second histogram distribution vector Y, the H(X) is calculated by $-\Sigma_x p(X)*\log p(X)$, the H(Y) is calculated by $-\Sigma_y p(Y)*\log p(Y)$, the p(X) is a probability distribution of the first histogram distribution vector X, the p(Y) is a probability distribution of the second histogram distribution vector Y, the x is a discrete probability variable of the first histogram distribution vector X, and the y is a discrete probability variable of the second histogram distribution vector Y.

16. The method of claim 11, wherein the providing of the weight comprises:
generating perceivable differences of the evaluation frame for each pixel;
generating means of the perceivable differences of the evaluation frame; and
providing a weight corresponding to the means of the perceivable differences.

17. The method of claim 16, wherein the generating of the perceivable differences comprises:
calculating an average brightness value of local pixels around each pixel for each pixel, and
providing the perceivable differences corresponding to average brightness values,
a perceivable difference has a value increasing along a first curve as the average brightness value increases, and has a value increasing along a second curve as the average brightness value decreases, based on a middle of a range of the average brightness values, and
the second curve has a higher rate of increase than the first curve.

18. The method of claim 16, wherein the providing of the weight comprises:
dividing a range in which the means are formed into a plurality of weighted ranges,
allocating a preset weight to each weighted range, and
outputting the weight having the weighted range corresponding to the means.

19. A display driver comprising:
an evaluation value storage unit configured to store an evaluation value associated with a display panel; and
a degradation compensator configured to receive the evaluation value and compensate for degradation by converting display data based on the evaluation value,
wherein the evaluation value corresponds to a value obtained by calculating normalized mutual information obtained by evaluating a correlation between histogram distribution vectors of a reference frame corresponding to a target grayscale level and an evaluation frame and a weight into which a cognitive characteristic of a distribution of grayscales of pixels of the evaluation frame is incorporated.

20. The display driver of claim 19, wherein the normalized mutual information is generated by normalizing a mutual information generated by using a first histogram distribution vector of the reference frame having the target grayscale level and a second histogram distribution vector of the evaluation frame displayed on the display panel in response to the target grayscale level.

* * * * *